Oct. 28, 1969   F. J. PEARNE ET AL   3,474,917
BRICK MACHINE
Filed April 27, 1966   8 Sheets-Sheet 2
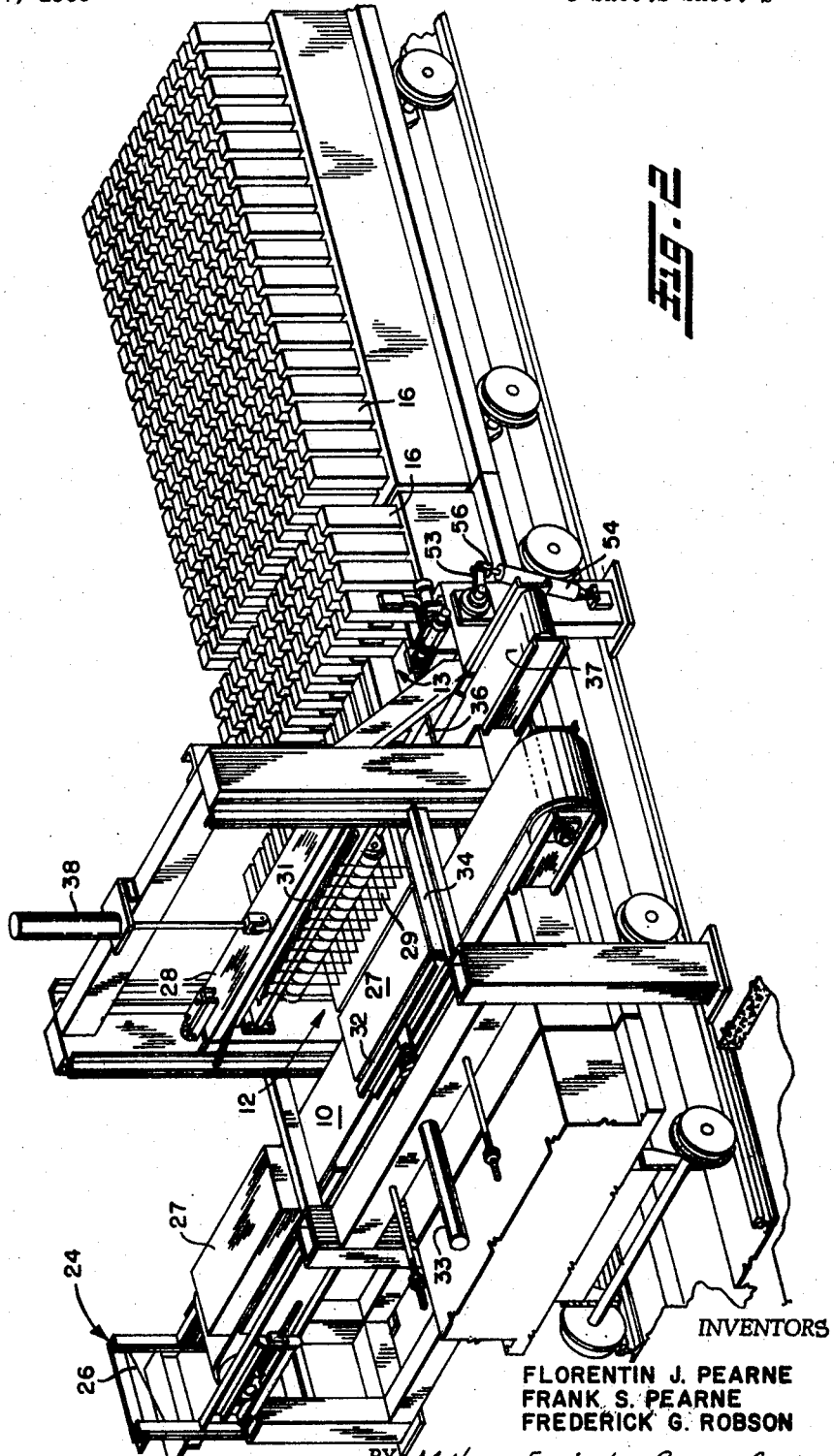
INVENTORS
FLORENTIN J. PEARNE
FRANK S. PEARNE
FREDERICK G. ROBSON
BY McNenny, Farrington, Pearne & Gordon
ATTORNEYS

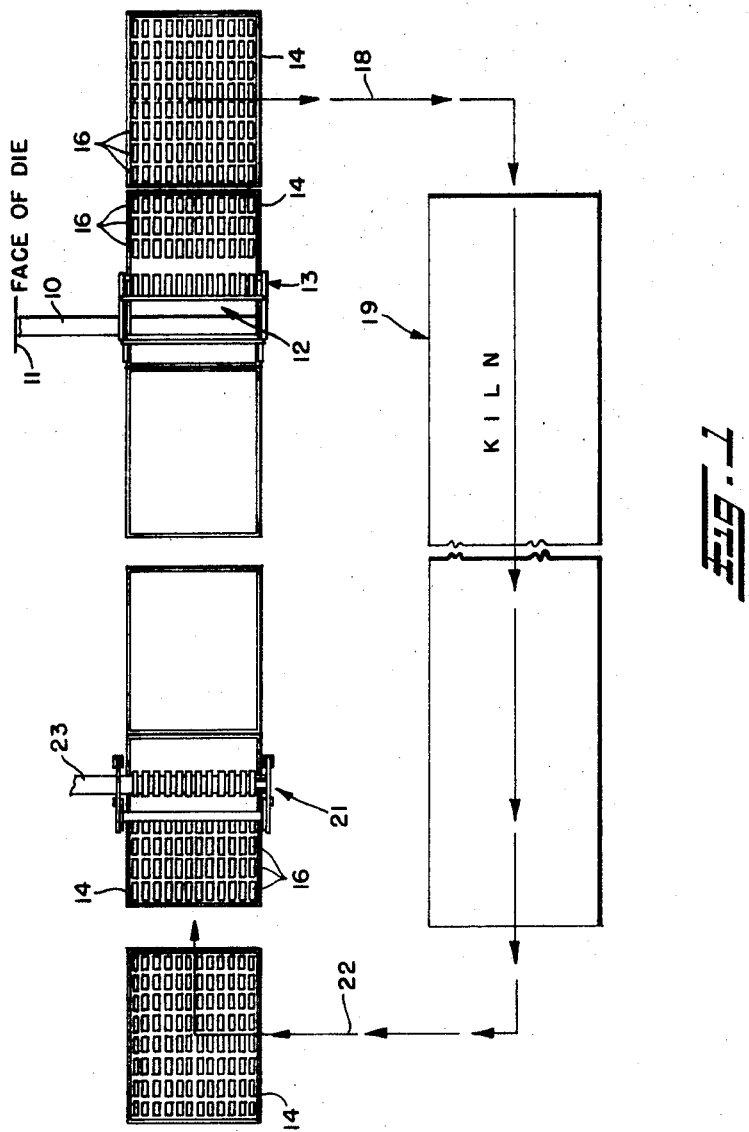

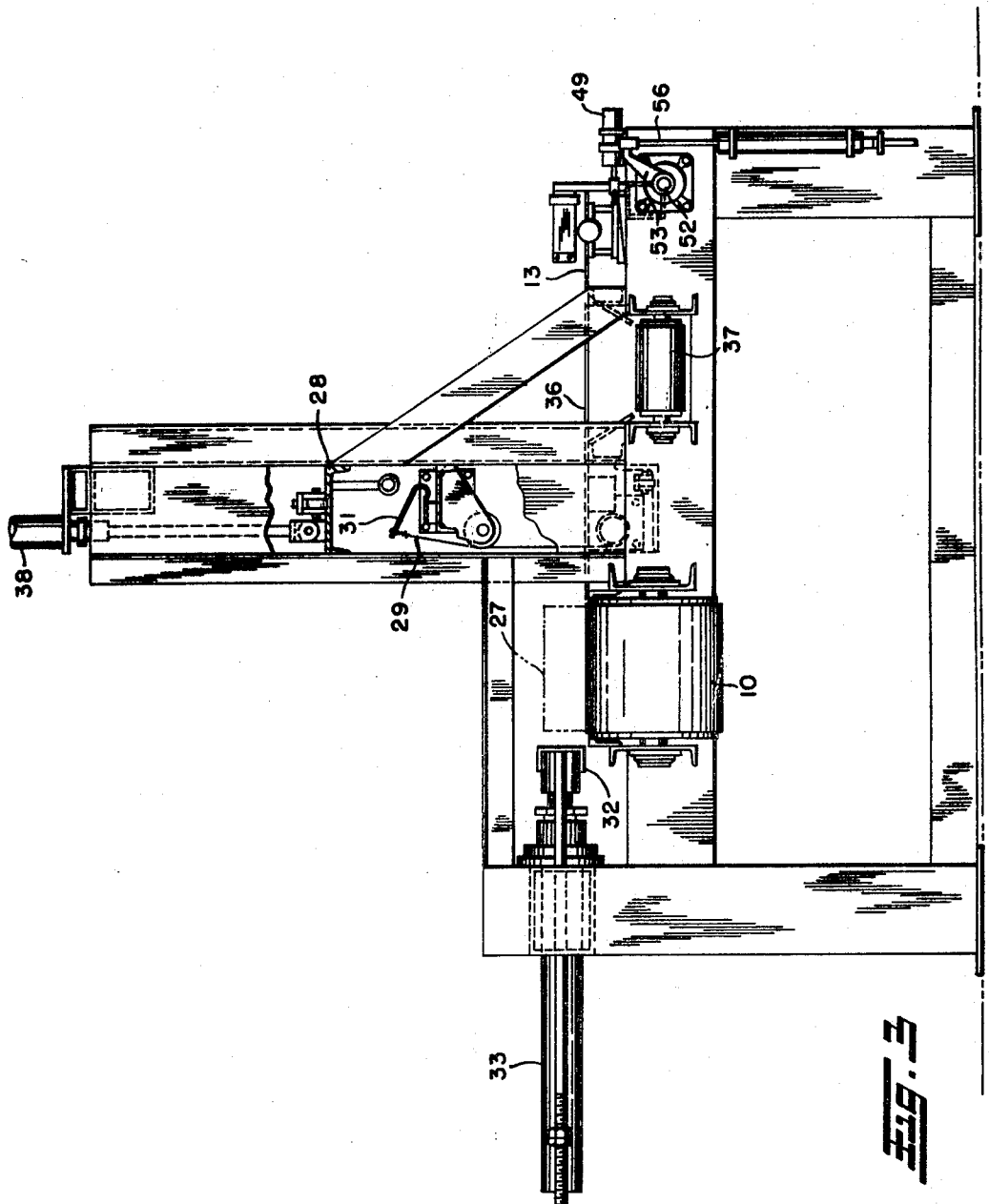

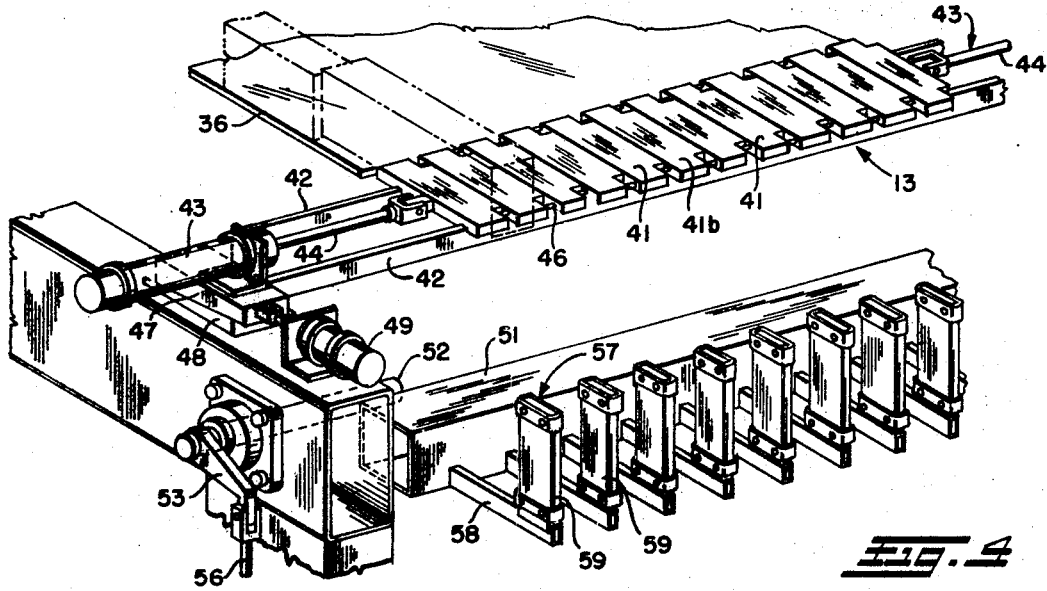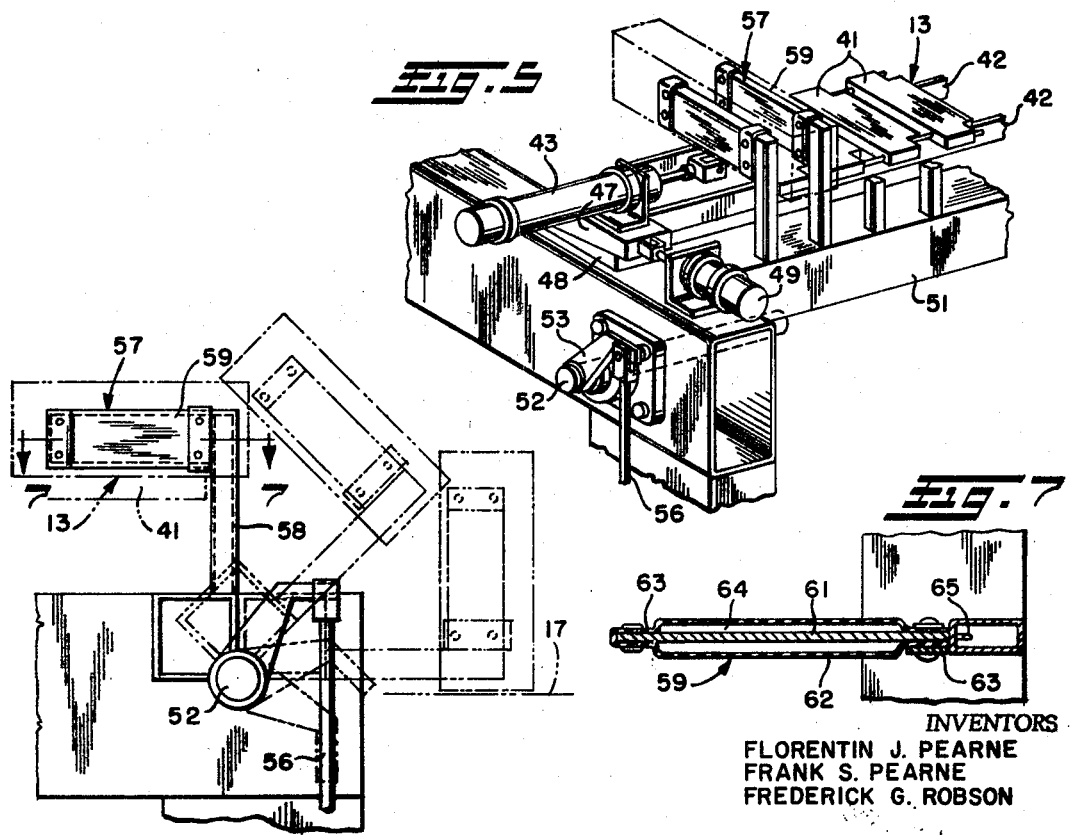

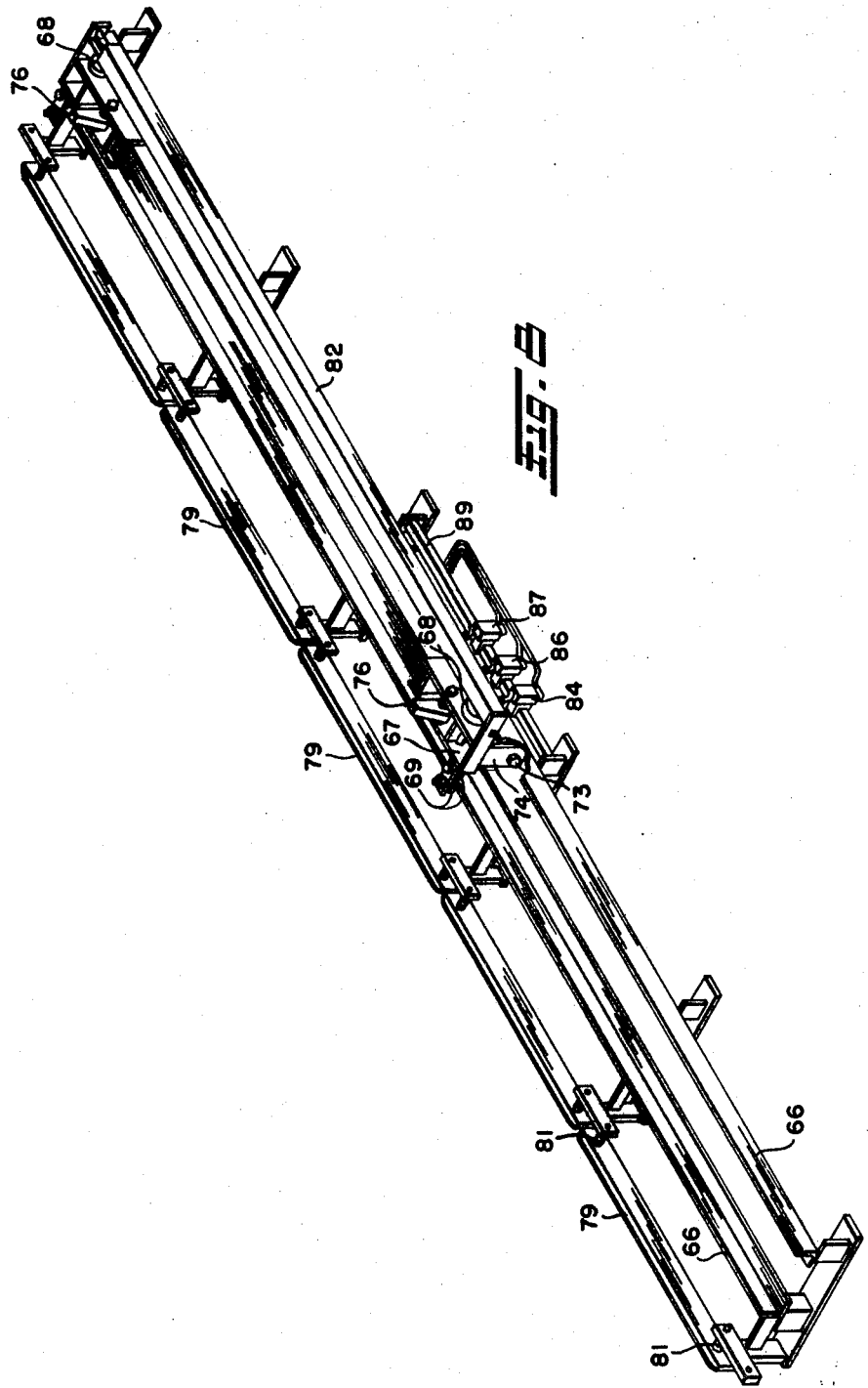

Oct. 28, 1969  F. J. PEARNE ET AL  3,474,917
BRICK MACHINE

Filed April 27, 1966  8 Sheets-Sheet 6

INVENTORS
FLORENTIN J. PEARNE
FRANK S. PEARNE
FREDERICK G. ROBSON

BY McNenny, Farrington, Pearne & Gordon
ATTORNEYS

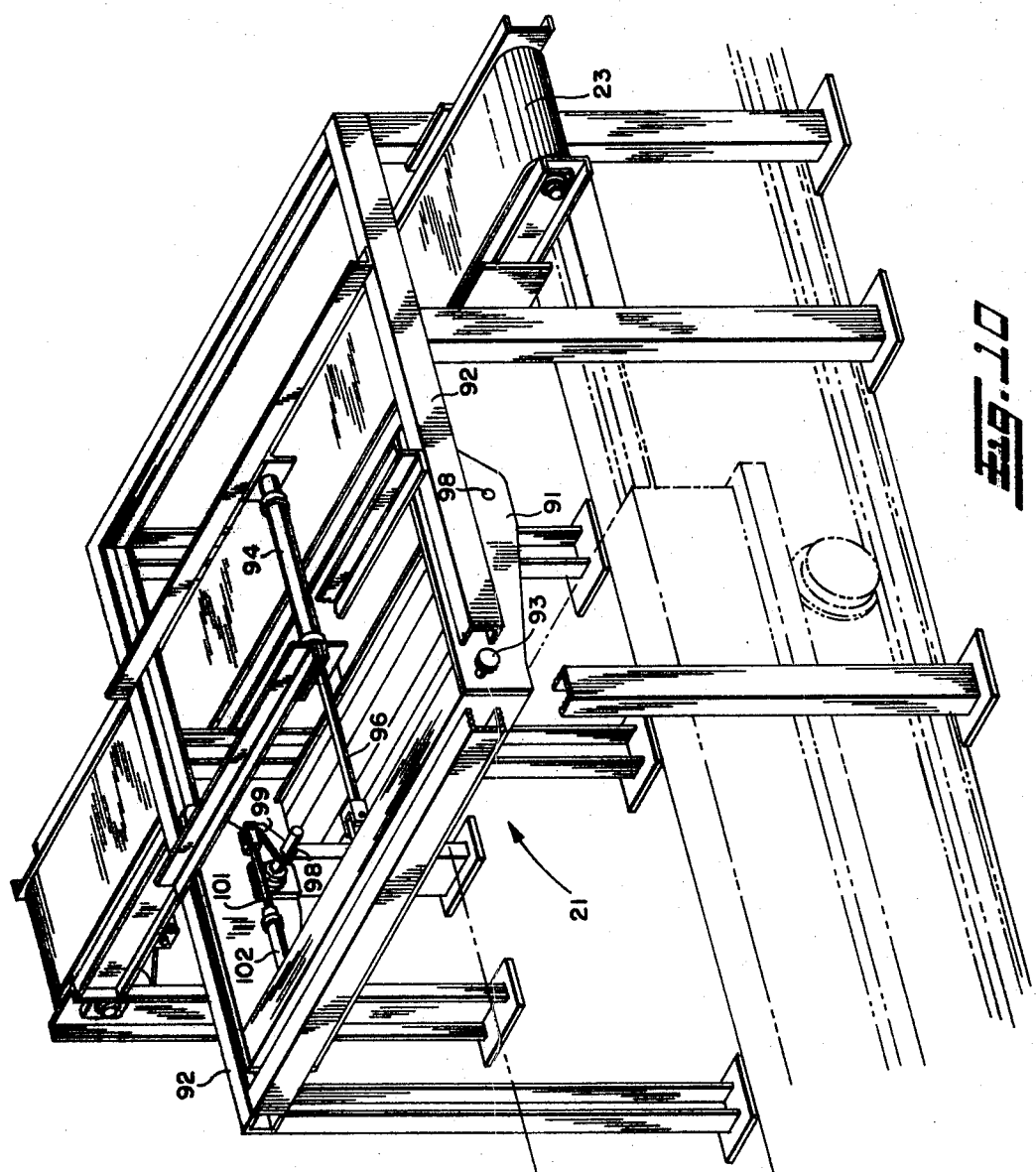

INVENTORS
FLORENTIN J. PEARNE
FRANK S. PEARNE
FREDERICK G. ROBSON

BY McNenny, Farrington, Pearne & Gordon
ATTORNEYS

3,474,917
BRICK MACHINE

Florentin J. Pearne, Alhambra, Frank S. Pearne, San Gabriel, and Frederick G. Robson, Long Beach, Calif., assignors to Pearne and Lacy Machine Company, Inc., Los Angeles, Calif., a corporation of California
Filed Apr. 27, 1966, Ser. No. 545,613
Int. Cl. B65g 69/20, 67/00; B65b 15/00
U.S. Cl. 214—7                               18 Claims

ABSTRACT OF THE DISCLOSURE

A fully automated brick machine comprising a belt conveyor for moving a succession of extruded green clay slabs to a brick cutter and hacker to be cut into a single row of bricks lying on their sides and pushed onto a separator table for subsequent handling, one row at a time. The bricks in a row on the separator table are separated and slightly elevated preparatory to transfer onto a kiln car movable along a closed path therebelow. A transfer mechanism grips each of the separated bricks simultaneously and swings the entire row up and then down through ninety degrees about a fixed axis for deposit on their ends in mutually spaced relationship on the kiln car, which advances stepwise to receive row after row until loaded. The loaded kiln car then moves along its closed path through a kiln to an unloader, where it is unloaded row by row, and back to the cutter and hacker for reloading. The unloader comprises a generally similar transfer mechanism that is mounted above the kiln car and grips and picks up one row of bricks at a time by swinging them upwardly through ninety degrees about a vertically fixed axis and then moving them horizontally over an off-bearing belt conveyor, onto which they are released for removal.

---

This invention relates generally to the manufacture of bricks and more particularly to a fully automated machine for such manufacture.

A machine incorporating the present invention completely eliminates all of the manual operations in the forming, handling and firing of bricks. In this machine the brick material is extruded through a die and cut into slugs of predetermined length. The slugs are carried by a conveyor to a cutting station where they are cut to form the individual bricks. When the cutting is completed the bricks are in rows of abutting and aligned bricks. The rows move from the cutter to a separator or spreader table which separates the individual bricks producing uniform spaces therebetween.

A gripper transfer individually grips the brick in an entire row and transfers each row from the separator table to a kiln car for firing. During the transfer, the bricks are turned through ninety degrees and are positioned in rows on the kiln car with the bricks standing on their ends. Automatic means move the cars forward each time a row is placed on the car, so that the car is in position to receive a subsequent row. The machine is arranged to load each car with rows of bricks which are all spaced from each other so that the firing is uniform.

After the car is fully loaded it moves through a kiln in which the bricks are fired to an unloader which automatically transfers the rows of bricks from the car to a conveyor. Preferably this conveyor transfers the bricks to an automatic stacker which packages the bricks for shipment. One such stacker is illustrated in the co-pending application, Ser. No. 441,496, filed Mar. 22, 1965, now Patent No. 3,392,851.

With a machine incorporating the present invention all of the manual operations are eliminated, so considerable cost savings are realized. The structure is arranged for simplicity to reduce the machine cost and to minimize maintenance. Still further, because the forming and handling operations are performed automatically high product quality results with a minimum of scrap or waste.

It is an important object of this invention to provide a novel and improved automated brick manufacturing machine operable to produce finished fired bricks without manual operations.

It is another object of this invention to provide a machine according to the preceding object having structural simplicity to reduce the manufacturing costs of the machine and to minimize maintenance.

It is another important object of this invention to provide a novel and improved brick hacking machine operable to automatically form bricks and position the bricks for firing in aligned rows consisting of a plurality of spaced bricks resting on their ends.

It is another important object of this invention to provide a novel and improved kiln car unloader operable to remove entire rows of fired bricks from a kiln car and position such rows on a conveyor which removes the bricks from the machine.

It is another important object of this invention to provide a novel and improved gripper mechanism operable to individually grip all of the bricks in a row and transfer such row from a first platform to a second platform, while turning the brick through ninety degrees so that they are positioned on their ends on the second platform.

It is another important object of this invention to provide a novel and improved pneumatic gripping mechanism for transferring bricks from one location to another while turning the bricks during the transfer operation.

It is another important object of this invention to provide an automatic brick handling machine for loading and unloading kiln cars with a plurality of rows of spaced bricks resting on their ends.

Further objects and advantages will appear from the following description and drawings, wherein:

FIGURE 1 is a schematic plan view of an entire machine incorporating the present invention;

FIGURE 2 is an enlarged perspective view of the brick cutting and hacking portion of the machine illustrating the apparatus for cutting the slugs into individual bricks and transferring such bricks to a kiln car;

FIGURE 3 is an enlarged side elevation of the portion of the machine illustrated in FIGURE 2;

FIGURE 4 is an enlarged, fragmentary, perspective view of the gripper transfer and spreader table structure illustrating the transfer in the release position and the spreader table in the closed position;

FIGURE 5 is a fragmentary, perspective view similar to FIGURE 4 illustrating a gripper in the gripping position and the spreader table in the open position;

FIGURE 6 is a fragmentary end elevation of the transfer illustrating the transfer in progressive positions as it operates to transfer the bricks;

FIGURE 7 is an enlarged cross section illustrating the structural detail of the grippers;

FIGURE 8 is a perspective view of the car indexing mechanism;

FIGURE 10 is a perspective view, with parts removed for purposes of illustration, of the car unloader structure;

Figure 9:
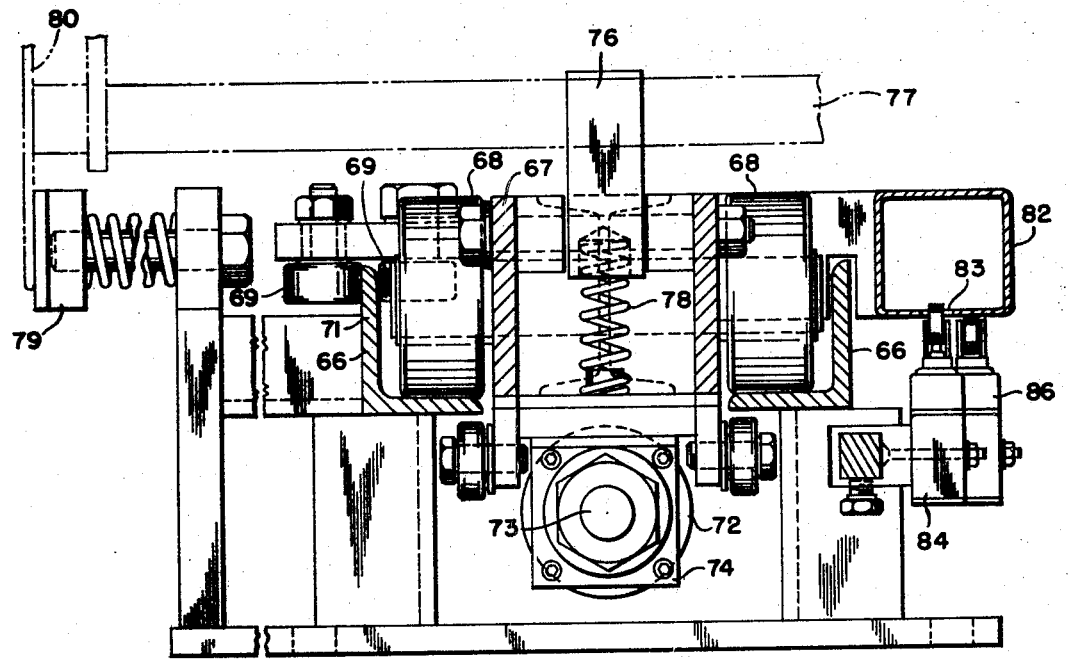
FIGURE 9 is a cross section of the car indexing mechanism illustrating the structural detail thereof.

Referring to FIGURE 1, an apparatus incorporating the present invention includes an off-bearing belt 10 adapted to receive the brick material from an extrusion die located at 11. The illustrated machine is arranged to form rows each containing twelve bricks. However, it should be understood that this machine is only one example of this invention and that machine can be arranged to form rows having greater or smaller numbers of bricks in each row. The extruded material is cut into slugs sufficiently long to form twelve bricks by a cutter adjacent to the face of the die. The off-bearing belt 10 is operated at a higher speed than the speed of extrusion so the slugs are spaced from each other as they are carried from the die to a cutter station 12.

At the cutter station the slugs are pushed laterally off of the belt 10 and through a cutter frame which cuts the slug into a row of aligned and abutting bricks. In the illustrated machine each row includes twelve individual bricks.

The row then moves onto a spreader table located at 13 which opens to produce uniform spacing between the individual bricks of the rows. A gripper transfer (not illustrated in FIGURE 1) then automatically and simultaneously grips the individual bricks in the entire row and transfers the row to a kiln car 14. When the bricks are on the spreader table, they rest on their backsides and during the transfers the bricks are turned through ninety degrees so that they stand on their ends on the kiln car in a row of aligned spaced bricks as illustrated at 16. Each time the transfer positions a row 16 on the kiln car power means automatically move the car forward the proper distance so that it is positioned to receive the subsequent row.

When an entire car is loaded, the car is automatically moved by conventional means along a track, schematically illustrated by the arrows 18, into a kiln 19 for firing. The kiln is the type wherein the bricks are fired as they are carried therethrough by the kiln car.

When the cars leave the kiln they move to an unloading station 21 along tracks schematically illustrated by the arrows 22. At the unloading station the rows 16 of fired brick are removed from the cars one row at a time and placed on a conveyor 23 which carries the fired brick from the machine. Preferably the conveyor leads to a stacker of the type generally disclosed in the co-pending application cited above. Such a stacker automatically packages the brick for shipment. It should be recognized, however, that a machine wherein the conveyor carries the fired brick to any other processing or handling apparatus is within the scope of this invention and that the stacker per se forms no part of this invention.

Reference should now be made to FIGURES 2 through 7 which illustrate the operation and structural detail of the cutter and hacker portion of the machine. The brick material extruded from the die passes through a cutter 24 having a cutter wire 26 operable to cut the extruded material into slugs 27 of sufficient length to make twelve bricks with a limited amount of scrap at each end. The off-bearing belt 10 runs with a surface speed faster than the rate of extrusion, so the slugs 27 are spaced from each other as they are carried along the belt 10 to the cutter and hacker station 12.

Located at the cutter and hacker station 12 is a cutter frame 28 provided with thirteen cutter wires 29, each spaced from the adjacent wire by a distance equal to the thickness of the required brick. The cutter wires 29 are resiliently placed in tension by leaf springs 31 and operate to cut through the slug material as the slugs 27 are pushed through the cutter frame by a pusher 32.

The pusher 32 is mounted on the piston of a piston and cylinder actuator 33 and is movable from a retracted position, illustrated in FIGURE 1, adjacent to one edge of the belt 10, to an extended position in which the pusher 32 is substantially adjacent to the cutter wires 29.

As the slugs 27 are carried along the belt 10 they engage a stop 34 which extends across the belt 10. The stop 34 holds the slug against further movement with the belt of the conveyor and properly positions the slug for cutting. The pusher 32 is then extended and the slug 27 is pushed laterally off of the belt 10 and through the cutter frame. The stroke of the actuator 33 is arranged so that each slug is pushed off of the belt 10 and most of the way through the frame. Since the pusher 32 does not push the slugs completely through the frame a flat faced pusher 32 can be utilized. The completion of the cutting operation of each slug is accomplished by pushing the subsequent slug into the frame. The subsequent slug supports the rearward face of the preceding slug and insures that the corners of the brick do not crumble.

After the slugs 27 have passed through the cutter frame 28 they are pushed along a table 36. As the rows are pushed along the table 36 toward the spreader table 13 the scrap at the ends of the rows drops over the ends of the table 36 onto a scrap conveyor 37. The scrap conveyor 37 carries the scrap back to the blender where it is remixed and re-extruded. Consequently, this scrap does not result in any waste or undesirable handling requirements. The cutter frame 28 is connected to a lifting actuator 38 which is operable to lift the frame up to a position where it can be serviced in the event that any of the wires 29 require replacement.

The spreader table 13 consists of a plurality of generally rectangular support members 41 having a width substantially equal to the width of the bricks. The support members 41 are mounted on support bars 42 (best illustrated in FIGURE 4) for lateral movement between a closed position illustrated in FIGURES 4 and 5a and an open position illustrated in FIGURES 5 and 5b. A piston and cylinder actuator 43 is provided at each end of the spreader table to provide power for the opening and closing movement thereof. The piston 44 of each actuator 43 is connected to the outermost adjacent support member so that extension of the pistons 44 push the support members 41 into an adjacent abutting relationship, as illustrated in FIGURE 4.

Figure 5A:
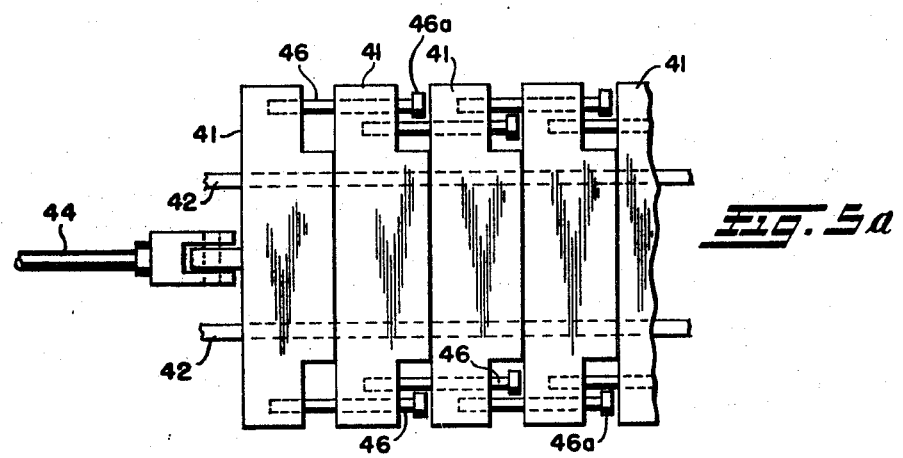
FIGURES 5a and 5b are fragmentary plan views of the spreader table in the closed and open position illustrating the operation of a structure of the lost motion connections.
Figure 5B:
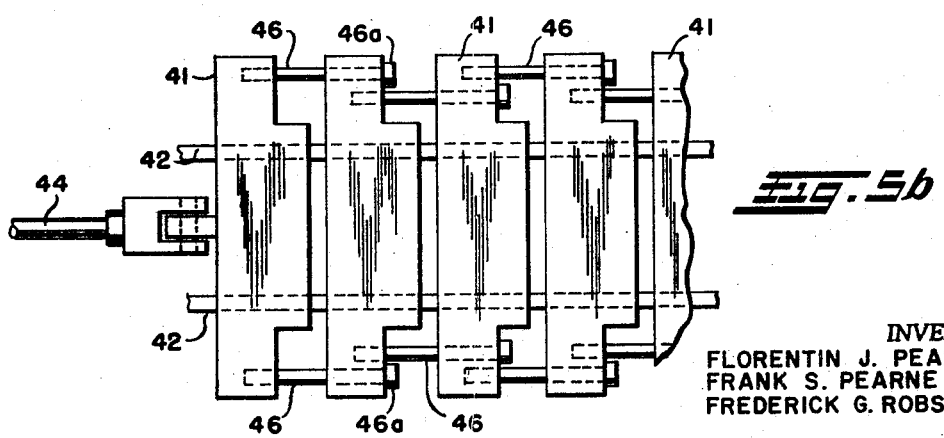

Retraction of the pistons 44 moves the outermost support member 41 laterally out from the center line of the machine and through lost motion connections 46 between adjacent support members pulls the individual support members apart until there is an even spacing between each of the support members 41, as illustrated in FIGURE 5. Referring to FIGURES 5a and 5b, the lost motion connection 46 includes bolt-like elements with heads 46a which engage the adjacent member to limit separating movement. Preferably, one of the centermost support members 41b is fixed against movement relative to the support bars so that the location of the members is positively determined.

The support table 13 is also provided with a second movement to lift the row of bricks up off of the table 36 before spreading is commenced. The support bars 42 are mounted on their ends on a wedge shaped member 47 which rests on wedge plates 48. An actuator 49 is connected to move the wedge member 47. A similar wedge structure 47 and 48 and actuator 49 is provided at each end of the support bars 42 and the two actuators 49 are connected for simultaneous operation.

At the beginning of each cycle the actuators 43 and 49 are extended. In this position the support members 41 are in their closed position and abut the edge of the table 36. The operation of the pusher 32 causes a row of cut bricks to slide along the table 36 onto the support members 41 with one brick on each member.

After a row of bricks is properly positioned on the spreader table by the action of the pusher 32, the actuators 49 are retracted. This causes the row of bricks to be moved up and away from the adjacent following row so that they are clear of the table or platform 36 and the adjacent row. After the actuators 49 are retracted the actuators 43 are retracted and the bricks are moved laterally to produce a uniform spacing therebetween. When the spreading operation is completed the individual bricks are in position to be gripped by the gripper mechanism.

The gripper mechanism includes a support bar 51 journaled at opposite ends on a shaft 52 for rotation through an angle of ninety degrees. A similar shaft 52 is provided at each end of the member 51. Connected to the outer end of one of the shafts 52 is an arm 53. An actuator 54 is pivotally connected at one end to the frame (as best illustrated in FIGURE 2) and is provided with a piston 56 connected to the arm 53. Retraction of the piston 56 rotates the support member 51 to the position of FIGURE 4 and extension of the piston rotates the member 51 through ninety degrees to the position illustrated in FIGURE 5.

Mounted on the support member 51 are thirteen pneumatic grippers 57 each including a support arm 58 and a pneumatically inflatable gripping assembly 59. The gripping assemblies 59 each include a plate element 61 (illustrated in FIGURE 7) and a tubular rubber-like sleeve element 62 extending therearound. Clamps 63 are provided at each end of the sleeve to seal it against the plate 61 so that the gripper sleeve 62 forms a pressure chamber 64.

The sleeve 62 is proportioned to be stretched by the plate 61 so that when air presure is not present in the chamber 64 the walls of the sleeve move in against the plate 61 so that when air pressure is not present in the chamber 64 through a pressure line 65 the walls of the sleeve move laterally away from the plate 61, as illustrated in FIGURE 7, to provide gripping of the bricks.

After the spreader table is opened by the actuators 43 the actuator 54 is extended to rotate the gripper assemblies 57 up between the bricks with one gripper assembly positioned on each side of each brick. During this movement the grippers are exhausted and they fit in between the bricks without contact. After the gripper assemblies are positioned between the bricks, as illustrated in FIGURE 5, the grippers are inflated and the sleeves 62 move outward and provide a gentle gripping on each of the bricks over a substantial area so that the surfaces of the bricks are not damaged.

It should be noted that the axis of the shaft 52 is to the right of the spreader table 13 so that the clockwise rotation of the gripper from the gripping position initially causes a raising of the bricks away from the support members 41 so that the surface of the bricks are not damaged as they are lifted away from the spreader table 13. Rotation of the grippers through ninety degrees around the axis of the shaft 52 moves the row of bricks to a position where the lower end of each brick is immediately adjacent to the surface of the kiln car 17. When the grippers with the row of bricks are in this position the grippers are exhausted and the bricks drop a fraction of an inch onto the kiln car and rest on their ends in a row. When this operation is completed the kiln car 17 is moved forward by an indexing mechanism so that it is in position to receive a subsequent row of bricks.

Reference should now be made to FIGURES 8 and 9 for the structure of the car indexing mechanism. This mechanism includes a pair of support rails 66 extending between the kiln car tracks lengthwise of the machine. An indexing carriage 67 is supported for longitudinal movement along the supports 66 by opposed rollers 68 journaled at each end of the carriage. Lateral alignment is provided by opposed rollers 69 which engage opposite sides of an upstanding flange 71 on one of the members 66.

A cylinder 72 is mounted beneath the support member 66 and is provided with a piston 73 connected to a depending flange 74 on the carriage 67 so that extension and retraction of the piston 73 moves the carriage backward and forward along the support rails 66. In FIGURE 8 the piston 73 is retracted and the carriage is in its forwardmost position. Extension of the piston 73 moves the carriage 57 to the left, as viewed in FIGURE 8.

The stroke of the piston 73 is at least as long as the length of the kiln cars 17. A pair of spring loaded feed dogs 76 are mounted at spaced points along the carriage 76 and are proportioned to engage an axle 77 on a kiln car to index the kiln car forward as it is loaded with bricks. The spacing between the two dogs 76 is such that when one dog engages the axle of one car the other dog engages the corresponding axle of the next adjacent car so that two cars are moved forward at the same time. The dogs are spring biased by a spring 78 toward their upstanding position but are free to swing downward under the axle 77 when the carriage 66 is returned to its rearward position.

Extending lengthwise of the indexing mechanism are a plurality of spring supporting friction bars 79 which are pressed against the inside of the wheels along one side of the kiln car. These bars provide friction which prevents the free rolling of the cars as they are indexed through the machine. Each of these brake members 79 is supported on its ends by a spring 81 which resiliently urges the members 79 into frictional engagement with the wheel 80 of the kiln car.

In order to control the operation of the piston 73 a control bar 82 is mounted lengthwise of the carriage 66 and is provided with appropriatly located openings 83 in its lower surface. These openings 83 are located in two rows. One row is in alignment with a control switch 84 and the other row is in alignment with control switches 86 and 87. The three switches are mounted on a bar 89 on the base of the mechanism. The row of openings 83 in alignment with the switch 84 are spaced lengthwise of the bar 82 by a distance equal to the distance between each indexing position of the kiln car. These openings are spaced laterally from the operators of the switches 86 and 87 so they only operate the switch 84. The row of openings 83 in alignment with the operators of the switches 86 and 87 control the extremes of movement of the carriage 67. When the switch 86 operates it signals that the carriage is at the right hand extreme of its travel and causes extension of the piston 73 until the switch 87 is operated to stop the extension and commence the subsequent indexing operation. In the illustrated machine each kiln car is loaded with seventeen rows of brick so there are seventeen openings in alignment with the switch 84 which operate the switch 84 in each indexing operation.

Figure 12:
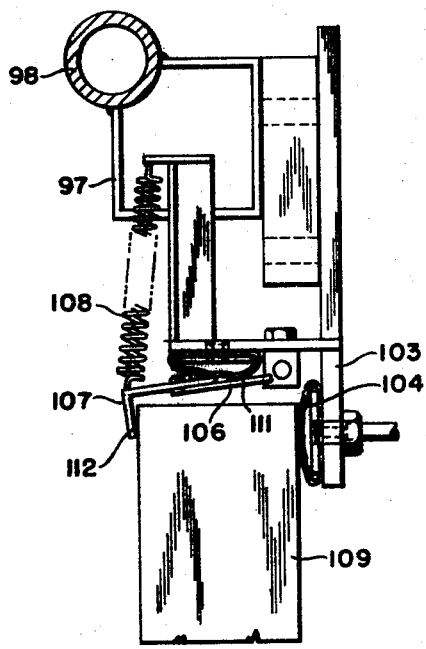
Figure 11:
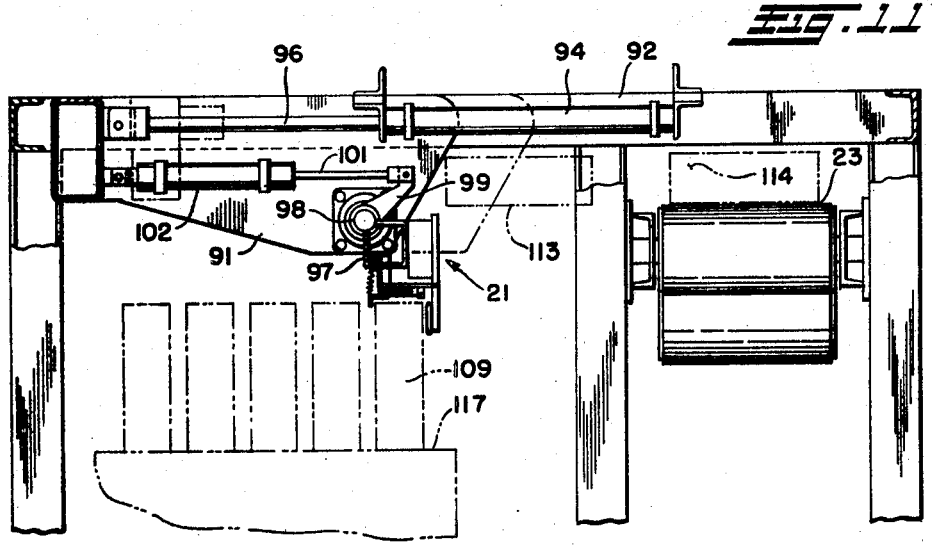
FIGURE 11 is a fragmentary side elevation of the car unloader illustrating the movement performed during each cycle of operation of the unloader; and, FIGURE 12 is an enlarged fragmentary section illustrating the structural detail of the gripper portion of the car unloader.

After the kiln cars are fully loaded they are transported by power means (not illustrated) through the kiln and to the unloading station. The structure of the unloader is best illustrated in FIGURES 10 through 12. Mounted at the unloading station 21 is a movable carriage 91 supported for reciprocating movement on frame members 92. Rollers 93 on the carriage 91 roll along opposed frame members 92 to guide and support the carriage. An actuator 94 is connected to the frame and provided with a piston 96 connected to the carriage so that extension and retraction of the piston 96 causes reciprocation of the carriage 91.

Mounted on the carriage 91 is a gripper mechanism, best illustrated in FIGURES 11 and 12. The gripper metchanism includes a bar 97 supported on shafts 98 which are in turn journaled on the carriage 91 for rotation through ninety degrees. Here again, an arm 99 is provided on one of the shafts and is connected to the piston 101 of an actuator 102. Retraction of the piston 101 causes rotation of the support bar 97 from the position illustrated in FIGURE 11 through ninety degrees. Mounted on the support bar 97 is a flange member 103 having a pneumatic gripper 104 mounted thereon. Also supported by the bar 97 is a pivot arm 106 having an angle iron gripper bar 107 mounted thereon. A spring 108 normally maintains the bar 107 in a position in which the bar clears a row of bricks 109. An inflatable tube 111 is positioned above the pivot arm 106 and is operable when pressurized to overcome the spring 108 and press the bar 107 downward to the position of FIGURE 12 wherein the lower flange 112 of the bar 107 is positioned behind the forwardmost row of brick on the kiln car.

When the gripper 104 is pressurized after the bar is in the lower position of FIGURE 12 the opposite sides of the top of the row of bricks 109 are securely gripped. The actuator 102 is then operated to retract the piston 101 to rotate the gripped bricks to the phantom position illustrated at 113. Here again, the axis of the pivot shafts 98 is located with respect to the gripped brick so that the initial movement is lifting and the ends of the brick are not dragged along the kiln car. Therefore, a light gripping is sufficient to maintain control of the bricks. Also, this structure utilizing an inflatable gripper automatically compensates for variations in brick size and insures uniform gripping.

As soon as the actuator 102 is fully retracted the actuator 94 is operated to retract its piston 96 to move the carriage 91 to the right until the brick are located over the conveyor 23 as illustrated by the phantom position 114. The gripper 104 is then deflated and the bricks are released onto the conveyor 23 and carried out of the machine. Here again, a car indexing mechanism as illustrated in FIGURES 8 and 9 is used to move the kiln car 17 forward each time the unloader removes a row of brick so that the unloader can swing back and pick up the subsequent row of brick.

Preferably the various actuators are pneumatically operated by suitable solenoid valves. However, a hydraulic system may be utilized if desired. Various valves are operated by suitably located sensing switches which are connected to provide the proper sequences of operation.

In operation the slugs 27 are carried by the off bearing belt 10 into the cutting station at which time the ends of the slugs engage the stop 34. Movement of a slug to this position operates a sensing switch which imitates the operation of the pusher 32. The pusher 32 operates to push the slugs 27 laterally through the cutter frame with the preceding slugs carried by the operation of the pusher across the table 36 and onto the separator table 13.

The actuators 49 and 43 are then sequentially operated so that the separator table lifts the row of cut brick and separates them so that the gripper assemblies 59 can be moved inbetween the individual bricks of the row. The grippers are then pressurized and the row is lifted from the separator table and turned through ninety degrees. The grippers are then exhausted and the bricks drop a fraction of an inch onto the kiln car where they rest on their ends. The kiln car is then indexed forward so that it is in position to receive a subsequent row of bricks. After the car is loaded it is carried through the kiln into the unloading station where the rows of bricks are gripped by the gripper transfer and rotated through ninety degrees. The transfer then moves forward until the row is over the conveyor belt 23. The gripper is then exhausted and the bricks are released onto the belt which carries them to the subsequent operation such as a stacking operation. Here again, each time a row of bricks is removed from the kiln car the kiln car is moved forward so that a subsequent row can be unloaded. From the unloader the kiln cars again pass to the cutter and hacker which reloads each car for refiring.

The controls for the various subassemblies are interconnected and include sensing devices such as limit switches to insure proper sequencing of the operations. For example, a sensing device is provided to initiate the operation of the pusher 32 when a slug is in proper position against the stop 34 and the separator table 13 is in position to receive a row of bricks. Another sensing device initiates the operation of the separator table 13 when a row is properly positioned thereon. The controls for the separator table actuators are arranged to provide sequential lifting and spreading operations.

A sensing device is provided to initiate movement of the transfer to position the gripper assemblies 59 between the bricks on the separator table 13 only after the table has completed its separating operation. The separator table controls are arranged so that the table actuators return the support members 14 to their initial brick receiving position after the bricks are gripped by the transfer and preferably after the transfer has commenced its transfer operation. The controls for the kiln car indexing mechanism are arranged to initiate indexing movement only after the transfer grippers are exhausted to release the row of bricks thereon.

In the unloading subassembly a sensing switch is provided to sense the presence and absence of a row of bricks at the unloading position. This sensing switch is connected to initiate operation of the unloader transfer when a row of bricks is in the unloading position and also initiates indexing movement of the kiln car when there is no row of bricks at this location.

In each of the subassemblies discussed immediately above the various operations are intermittent and are controlled so that each function is initiated upon the presence of a slug or row of bricks in proper position. The extruder, however, is preferably operated continuously with its rate of operation adjusted so that it does not supply material faster than it can be handled by the remaining portions of the machine. Preferably the controls are arranged so that a malfunction occurring at any location in the machine will automatically terminate the operation of the preceding subassembly to prevent jamming of any particular area within the machine.

Although a preferred embodiment of this invention is illustrated, it is to be understood that various modifications and rearrangements of parts may be resorted to without departing from the scope of the invention.

What is claimed is:

1. An automated machine for manufacturing bricks, comprising means operable to form block-like slugs and deliver said slugs to a cutter station, a cutter at said cutter station operable to cut each slug into a row of aligned and abutting elongated bricks resting on long sides thereof, spreader means receiving said row from said cutter and operable to spread the bricks in said row to produce spaces therebetween while they remain resting on said long sides thereof, transfer means operable to individually grip the bricks of an entire row on said spreader means and position such bricks on their ends on a platform, said transfer means including gripper means insertable between bricks of the row on the spreader to grip opposing surfaces of each brick while said bricks are lying on said long sides thereof on the spreader, and said transfer means being mounted for swinging motion about a substantially horizontal axis for turning each row through substantially ninety degrees during the transfer operation, and indexing means operable to move said platform each time a row is positioned thereon so that the platform is in position to receive a subsequent row.

2. A brick hacker comprising a brick marshalling platform having a generally horizontal upper surface, a spreader table including a plurality of spreader members each adapted to support a brick, first power means operable to move said spreader members from a first position in which said members are adjacent to and aligned with said upper surface to a second position above said upper surface, and second power means operable to move said members between a closed position and an open position, said second power means operating to maintain said members in said closed position when they are in said first position so that they can receive a row of aligned and abutting brick from said platform, said first and second power means then operating to sequentially move said members from said first position and to said open position to separate the bricks in said row.

3. A hacker as set forth in claim 2 wherein said first power means moves said members along a path inclined upward and away from said upper surface of said platform.

4. A hacker as set forth in claim 2 including transfer means operable to individually grip each brick on said spreader table and remove such brick therefrom.

5. A brick transfer and reorienting mechanism for transferring an aligned row of spaced correspondingly oriented, parallel bricks from one supporting surface to another while reorienting the row of bricks, comprising a horizontal shaft rotatably mounted at a fixed elevation, gripper arm means extending transversely from said shaft for swinging thereon and including gripper elements fixed on said gripper arm means against rotary movement relative thereto and disposed to grip opposite, generally vertical, lateral exterior sides of each of said bricks when arranged in said row at a pick-up location at one elevation, means operative to oscillate said shaft for rotating said gripper means and gripper elements together therewith through ninety degrees while swinging them together between a pick-up orientation and location at one elevation and to release orientation at a laterally offset location at a different elevation, and means for actuating the gripper elements to simultaneously grip each brick in said row at said pick-up location and to reversely actuate the gripper elements for simultaneously releasing each brick in said row after rotation of said shaft through said ninety degrees, whereby said gripper means, gripper elements, and bricks are rotated together through ninety degrees to their release orientation as they are swung through ninety degrees about said shaft from said pick-up location for release at a different elevation and at a laterally offset release location, one of said supporting surfaces being a kiln car or the like.

6. An article transfer and reorienting mechanism according to claim 5 in which said shaft is parallel to said row.

7. An article transfer and reorienting mechanism according to claim 6, including means operative to reciprocate said shaft horizontally and transversely of its axis between an article pick-up position and an article release position.

8. A machine according to claim 5 in which said vertically fixed horizontal axis is parallel to said row and laterally offset from all article-engaging portions of said first supporting surface from which the articles are to be transferred so as to prevent interference of that surface with the articles during initial swinging movement of said gripper means.

9. A machine of the character described comprising:
(a) means operable to form elongated slugs of moldable material and move them sequentially through a cutter station to cut each slug into a row of aligned, correspondingly oriented and abutting bricks and to deposit the bricks of said row respectively on separable coplanar portions of a first supporting surface;
(b) means operable to move said separable surface portions for spreading the bricks in said row to produce spaces therebetween and dispose them at a predetermined level without altering their alignment or orientation;
(c) means operable to provide a movable article supporting surface laterally spaced from the row of separated bricks and at a lower predetermined level; and
(d) reorienting and transfer means mounted adjacent said article supporting surfaces for simultaneously gripping opposite, vertical, exterior sides of each of the articles in said row and simultaneously transferring them onto said movable article receiving surface at its lower predetermined level while reorienting the articles by turning them through substantially ninety degrees about a horizontal axis.

10. A machine according to claim 9 in which the first mentioned means forms elongated bricks and deposits them resting on horizontal elongated sides on the separable portions of said first supporting surface, said reorienting and transfer means includes a gripper assembly movable between each pair of adjacent bricks of said row after they have been spread for gripping vertical elongated sides thereof and deposits them on their ends on said movable article supporting surface, and power indexing means are provided for advancing said movable surface to receive a subsequent row of bricks each time a preceding row of bricks is deposited thereon.

11. A machine according to claim 10 wherein said gripper assembly includes a flat plate with a rubber-like tube extending therearound, the ends of said tube being closed so that it forms a fluid-tight chamber, the walls of said tube resting substantially against said plate when said chamber is unpressurized and moving laterally in opposite directions into gripping engagement with adjacent bricks when said chamber is pressurized.

12. A machine according to claim 9 in which said means providing a movable article supporting surface comprises a kiln car and means for advancing the same stepwise along a horizontal path extending under said first supporting surface to a loading location, said machine also including a kiln car unloader disposed above a kiln car on said path remote from said first supporting surface and from said loading location, said unloader comprising an off-bearing surface and reorienting and transfer means mounted adjacent said off-bearing surface above a kiln car on said path remote from said first supporting surface and from said loading location for simultaneously gripping opposite, vertical, exterior sides of each of the articles in said row resting on said kiln car and simultaneously transferring the entire row onto said off-bearing surface while reorienting the articles by turning them through substantially ninety degrees about a horizontal axis.

13. A machine according to claim 12 in which the first mentioned means forms elongated bricks and deposits them resting on horizontal elongated sides on the separable portions of said first supporting surface and said first mentioned reorienting and transfer means deposits said bricks on their ends on said movable surface, and said second mentioned reorienting and transfer means includes a gripper bar retractable clear of said row on said movable article supporting surface as it approaches the row and extendible into position to grip one side of each article in said row, and a pressure operated gripper member operable to cooperate with said gripper bar to engage and grip the opposite side of each article in said row, said second mentioned reorienting and transfer means being operable to move said row horizontally over said off-bearing surface after turning the bricks thereof through ninety degrees.

14. A machine according to claim 13 in which said gripper bar and gripper member extend the length of said row and said gripper member is an inflatable tube automatically compensating for variations in brick dimensions.

15. A machine of the character described comprising:
(a) means providing a first article supporting surface movable between lower and upper predetermined levels;
(b) means providing an article receiving surface at a still lower predetermined level and laterally spaced from said first supporting surface;
(c) means for moving an aligned row of correspondingly oriented, parallel articles to predetermined locations on said first supporting surface at its lower predetermined level;
(d) means for separating the several articles supporting portions of said first supporting surface for spreading the articles in said row to produce spaces therebetween without altering their alignment or orientation;
(e) means for uniformly elevating the article supporting portions of said first supporting surface with the articles thereon to said upper predetermined level; and
(f) reorienting and transfer means mounted adjacent said supporting and receiving surfaces for simultaneously gripping opposite, generally vertical, exterior sides of each of the articles in said row on said supporting surface portions at their upper predetermined level and simultaneously transferring the entire row onto said article receiving surface at said still lower predetermined level while reorienting the articles by turning them through substantially ninety degrees about a horizontal axis.

16. A machine of the character described comprising:
(a) a kiln car mounted for travel along a path from a loading zone for loading it with green clay articles, through a kiln for firing the articles, to an unloading zone for removing the fired articles, said kiln car providing an article supporting car surface;
(b) article supply means mounted at said loading zone and providing an article supporting and supply surface over a car moving along said path and above the level of said car surface, said article supply means including means for moving a row of aligned, correspondingly oriented, parallel articles onto said supply surface;
(c) article off-bearing means mounted at said unloading zone and providing an article supporting off-bearing surface over a car moving along said path and above the level of said car surface;
(d) reorienting and transfer means mounted adjacent said supply and car surfaces at said loading zone for simultaneously gripping opposite, generally vertical, exterior sides of the articles of said row on said supply surface and simultaneously transferring the entire row onto said car surface at a lower level while reorienting the articles by turning them through substantially ninety degrees about a horizontal axis; and
(e) reorienting and transfer means mounted adjacent said off-bearing and car surfaces at said unloading zone for simultaneously gripping opposite, generally vertical, exterior sides of correspondingly oriented, parallel articles disposed in alignment in a row on said car surface and simultaneously transferring the entire row onto said off-bearing surface at a higher level while reorienting the articles by turning them through substantially ninety degrees about a horizontal axis, said reorienting and transfer means both including gripper elements mounted for swinging about a vertically fixed horizontal axis parallel to a row of articles to be transferred, said gripper elements extending transversely from said vertically fixed horizontal axis for swinging together through substantially ninety degrees about the latter axis, said swinging being from positions and orientations of the gripper elements for simultaneously gripping each of the articles in said row while they are resting at a predetermined level on a first surface to positions and orientations of the gripper elements in which the articles have been turned thereby through substantially ninety degrees and moved thereby to a different predetermined level for deposit on a second surface at a different level than said first surface.

17. A machine according to claim 16 in which said vertically fixed horizontal axis is laterally offset from all article-engaging portions of said first surface so as to prevent interference of that surface with the articles during initial swinging movement thereof.

18. A machine according to claim 17, including means for actuating said gripper elements while in their article gripping orientations to simultaneously grip each of the articles in the row individually and for reversely actuating said gripper elements in their article depositing orientations to simultaneously release the articles for deposit on said second surface.

References Cited

UNITED STATES PATENTS

| | | | |
|---|---|---|---|
| 1,641,582 | 7/1927 | Hanley | 25—2 |
| 2,609,113 | 9/1952 | Huffman | 294—63 X |
| 2,710,696 | 6/1955 | Fontaine et al. | 214—6 |
| 3,037,644 | 6/1962 | Segur | 214—6 |
| 3,101,852 | 8/1963 | Pearne | 214—7 |
| 3,232,446 | 2/1966 | Spurr et al. | 214—1 |
| 2,800,992 | 7/1957 | Kuper | 214—7 X |
| 3,050,198 | 8/1962 | Schmunk et al. | 214—6 |

GERALD M. FORLENZA, Primary Examiner

ROBERT J. SPAR, Assistant Examiner

U.S. Cl. X.R.

25—2; 214—1, 38

UNITED STATES PATENT OFFICE
CERTIFICATE OF CORRECTION

Patent No. 3,474,917

October 28, 196

Florentin J. Pearne et al.

It is certified that error appears in the above identified patent and that said Letters Patent are hereby corrected as shown below:

Column 5, cancel line 29 and substitute -- plate 61. However, when air pressure is supplied to the --. Column 6, line 1, cancel "57" and substitute -- 67 --; line 63, cancel "metchanism" and substitute -- mechanism --. Column 9, line 21, after "and", "to" should read -- a --.

Signed and sealed this 24th day of February 1970.

(SEAL)
Attest:

Edward M. Fletcher, Jr.
Attesting Officer

WILLIAM E. SCHUYLER, JR.
Commissioner of Patents